United States Patent [19]

Škubla et al.

[11] Patent Number: 5,476,642
[45] Date of Patent: Dec. 19, 1995

[54] MAGNESIUM HYDROXIDE AND PROCESS FOR PRODUCTION THEREOF

[75] Inventors: Pavol Škubla; Štefan Bezák, both of Šaľa; Ladislav Lencses, Horná Kráľová; Eve Kuková, Šaľa, Yugoslavia

[73] Assignee: Duslo, a.s., Sala, Yugoslavia

[21] Appl. No.: 247,784

[22] Filed: May 23, 1994

[30] Foreign Application Priority Data

May 26, 1993 [YU] Yugoslavia .................. PV 05 39-93

[51] Int. Cl.$^6$ .................................. C01F 5/14; C01F 5/20
[52] U.S. Cl. .................... 423/162; 106/18.26; 423/158; 423/173; 423/274; 423/635; 423/639
[58] Field of Search .................. 423/635, 639, 423/158, 162, 274, 173; 106/18.26

[56] References Cited

U.S. PATENT DOCUMENTS

| | | | |
|---|---|---|---|
| 4,145,404 | 3/1979 | Miyata et al. | 423/639 |
| 4,695,445 | 9/1987 | Makaya et al. | 423/639 |
| 5,143,965 | 9/1992 | Mertz | 423/639 |

*Primary Examiner*—Wayne Langel
*Attorney, Agent, or Firm*—Parmelee, Bollinger & Bramblett; George W. Rauchfuss, Jr.

[57] ABSTRACT

Magnesium hydroxide of the formula $Mg(OH)_2$ having a crystallite size in the direction <004> greater than 150 Å and smaller than 500 Å, an aspect ratio in the range from 2 to 5, a strain in the direction <004> not greater than $4.2 \times 10^{-3}$ and a strain in the direction <110> not greater than $3.0 \times 10^{-3}$. 50% of secondary particles with diameters smaller than 1.4 μm and 100% of secondary particles with diameters not greater than 4.0 μm, and a specific surface, determined by the BET method, smaller than 25 m$^2$/g. It is prepared by a two-step procedure; in the first step, magnesium nitrate is treated by an alkaline substance, preferably by ammonia, in an aqueous medium, with 1.5 to 6.0-multiple excess of ammonia, at a temperature of not more than 85° C., at the atmospheric pressure, causing that basic magnesium nitrate is formed which, in the second step, decomposes at a temperature of 110° to 150° C. and at a pressure not greater than 1.5 MPa. It is profitable to use 3.0 to 5.0-multiple excess of ammonia at a temperature of 50° to 75° C. and to decompose the nitrate at a temperature of 120° to 130° C. at a pressure of 0.3 to 1.3 MPa.

13 Claims, No Drawings

MAGNESIUM HYDROXIDE AND PROCESS FOR PRODUCTION THEREOF

BACKGROUND OF THE INVENTION

1. Field of the Invention

The invention relates to magnesium hydroxide of the chemical formula $Mg(OH)_2$ with new characteristics and process for production thereof. The $Mg(OH)_2$ of this invention differs from known $Mg(OH)_2$ and exhibits superior performance and properties in such uses as fire retardants for thermoplastic synthetic resins and aqueous paints as well as other well known applications for conventionally available magnesium hydroxides.

2. Description of the Prior Art

It is generally known that for the use in thermoplastic materials the most favorable magnesium hydroxide, coated or uncoated with a surface active agent, is one which exhibits well developed crystallinity and is chemically inactive. Such magnesium hydroxide has small specific surface $S_{BET}$, usually less than 20 to 25 $m^2/g$. It is equally important when incorporating such magnesium hydroxide in a thermoplastic material that secondary particles should be as small as possible and their size distribution should be as narrow as possible. Magnesium hydroxide without the required properties after incorporating in thermoplastic materials causes a considerable deterioration of their physical parameters, especially their flow and shape properties. Such deterioration creates local inhomogeneities in the thermoplastic materials which appear on the material surface as color patterns.

Conventional available magnesium hydroxides do not fulfil these requirements and usually have large specific surface $S_{BET}$—up to 100 $m^2/g$. Most procedures leading to preparation of special types of magnesium hydroxide with small secondary particles and with small specific surface $S_{BET}$ start with preparation of large crystals. Known procedures are adding of small amounts of citric acid or its salts (JP 10,784/1958/) or removing calcium cations (JP 10,786/1958/), ensuring that large crystals are formed. A different procedure (EP 0 189 098 A2) leads to morphologically different magnesium hydroxide with spherical, not angular secondary particles of the average size 5–500 μm. Use of the procedure of EP 0 365 347 results in secondary particles with large specific surface $S_{BET}$ of 20 to 50 $m^2/g$.

Magnesium hydroxides produced by the process described in U.S. Pat. Nos. 4,098,762 and 4,145,404 are characterized by crystallite size in the direction <101> greater than 800 Å and a strain in the <101> direction not greater than $3.0 \times 10^{-3}$. Secondary particles arising from these crystals, exhibit specific surface $S_{BET}$ less than 20 $m^2/g$.

A common disadvantage of the procedures leading to preparation of large crystals of magnesium hydroxide is the necessity to work with diluted solutions which causes large consumption of energy when the procedures are applied. A disadvantage of the procedure disclosed in the cited U.S. Pat. Nos. 4,098,762 and 4,145,404 consists in the formation of very large crystals (the crystallite size in the direction <101> is 800 to 10000 Å) with undefined shape, e.g. they may have an arbitrary ratio of crystal base width to crystal height (crystal size in the direction <101> does not define the crystal shape). In this way crystals may form which are thin and high or thick and low, but also crystals with approximately comparable thickness and height. Aggregation of such nonuniform crystal shapes leads to formation of secondary particles with higher specific surface $m^2/g$. The above mentioned disadvantage must be compensated for by preparation of large crystals (examples 1 to 5 U.S. Pat. No. 4,145,404 which report the crystallite size in the direction <101> as up to 2250–5260 Å°).

SUMMARY OF THE INVENTION

In accordance with the present invention improved magnesium hydroxide is produced having new structural characteristics clearly distinguishable from known magnesium hydroxides and which has superior properties and is free from the disadvantages of known magnesium hydroxides. It has also been discovered that the magnesium hydroxide of this invention can be produced on a commercial scale by the described process which process has not been performed heretofore.

Accordingly it is an object of this invention to provide a $Mg(OH)_2$ having a new structure and improved properties which eliminate the above mentioned disadvantages of conventionally known magnesium hydroxides.

Another object of this invention is to provide a process for producing $Mg(OH)_2$ having a new structure with commercial advantage.

Still another object of this invention is to provide a magnesium hydroxide either in its uncoated form or coated with a surface active agent, which exhibits favorably improved properties when used as a flame/smoke suppressant for thermoplastic synthetic resins.

A further object of this invention is to provide a magnesium hydroxide having a new structure which in its coated or uncoated form can be used in a wide range of applications for which conventional magnesium hydroxide has been heretofore been known to be useful.

The magnesium hydroxide produced by this invention is characterized by a crystallite size in the direction <101> of 720 Å or below, a crystallite size in the direction <004> greater than 150 Å and smaller than 500 Å, an aspect ratio in the range from 2 to 5, a strain in the direction <004> not greater than $4.2 \times 10^{-3}$ and a strain in the direction <110> not greater than $3.0 \times 10^{-3}$. Moreover, the magnesium hydroxide mentioned above contains 50% of secondary particles with diameters smaller than 1.4 μm, and a specific surface, determined by the $S_{BET}$ method, smaller than 25 $m^2/g$.

DETAILED DESCRIPTION OF THE INVENTION

Magnesium hydroxide is prepared in two steps by the process of this invention. In the first step magnesium nitrate is treated by an alkaline substance, preferably by ammonia, in an aqueous medium at a temperature not higher than 85° C., at atmospheric pressure, resulting in forming of basic magnesium nitrate. It was found that it is profitable to use in the first step 1.5- to 6.0-multiple, with advantage 3.0- to 5.0-multiple excess of ammonia, at a temperature of 50° to 75° C. The resulting basic magnesium nitrate decomposes hydrothermally in the second step at a temperature of 110° to 150° C., preferably at 120° to 130° C. and at a pressure not greater than 1.5 MPa, generally at a pressure of 0.3 to 1.3 Mpa. The suspension obtained after the first step is heated in pressure equipment, causing pressure increases, and the temperature is held constant at the required value for one hour. The pressure is gradually reduced by draining the gaseous ammonia off the pressure equipment so that at the end of one hour the pressure drops to 0.3 MPa. After the pressure is relieved, the suspension is cooled down to a temperature of 50° to 60° C., filtered and after washing in demineralized water dried or—if necessary— disengaged by floating in demineralized water and treated by a suitable surface active agent before drying.

The magnesium nitrate starting material used in the inventive process is advantageously obtained by continuously decomposing milled magnesite in diluted nitric acid at elevated temperatures in a decomposition reactor. The resulting acidic solution of magnesium nitrate and undecomposed magnesite is passed to a sedimentation vessel where the undecomposed magnesite is separated and then passed back to the decomposition reactor. Acidic magnesium nitrate solution is neutralized by gaseous ammonia and recovered with precipitated $Fe(OH)_3$ being isolated on a belt vacuum filter. The magnesium nitrate concentrate is mixed in a precipitation vessel with $H_2O_2$, which causes $MnO_2$ precipitation. Precipitated $MnO_2$ and any residual $Fe(OH)_3$ are separated form the magnesium nitrate concentrate. The magnesium nitrate concentrate is recovered for use in making magnesium hydroxide.

Magnesium hydroxide produced by the process of this invention after incorporating in thermoplastic materials improves their properties, especially flame and smoke resistance and surface appearance without adversely affecting melt shapability and physical properties.

It was found that these and other properties of the magnesium hydroxide are decisively affected by characteristics of the $Mg(OH)_2$ crystal, especially by its shape, size and strain. Individual crystals aggregate and form secondary particles of angular shape which are characterized by the specific surface $S_{BET}$ and their size (distribution of diameters of the particles). The characteristics of the secondary particles are important as well, but these depend already on the shape, size and strain of the crystal. In general, it holds, that the ability of crystals to aggregate and to form secondary particles of higher dimensions and of higher specific surface increases with the decrease of crystallite size.

An important finding following from our results is that the crystal shape represented by the aspect ratio AR, where AR=D/H, D being the diameter of the crystal base expressed as the crystallite size in the direction <110>, H being the crystal height expressed as the crystallite size in the direction <004>, is the dominating crystal parameter which directly affects the specific surface $S_{BET}$. It was found that if crystals of magnesium hydroxide with an aspect ratio not smaller than 2 and not greater than 5 are prepared, these need not fulfil the condition of largest possible size, but it is sufficient if the crystallite size in the direction <004> is greater than 150 Å and less than 500 Å.

While especially the shape and also the size of the crystal constitute necessary geometrical conditions for aggregation of crystals into secondary particles, strain characterizes tendency of the crystals, caused by the surface forces, to aggregate into secondary particles. The smaller is the strain, the smaller is the probability of formation of large secondary particles. If mentioned conditions for the crystal shape and size are fulfilled, it is sufficient if the strain in the direction <004> is not greater than $4.2 \times 10^{-3}$ and the strain in the direction <110> is not greater than $3.0 \times 10^{-3}$. Magnesium hydroxide produced according to this invention usually exhibits the values for the strain in the direction <004> between $1.0 \times 10^{-3}$ and $3.0 \times 10^{-3}$ and in the direction <110> between $0.5 \times 10^{-3}$ and $2.5 \times 10^{-3}$.

Magnesium hydroxide produced according to this invention exhibits new characteristic properties which can be determined by the X-RAY powder diffraction method and by which it is differentiated from other magnesium hydroxides known so far. The properties are a crystal size in the direction <004> of more than 150 Å and less that 500 Å, and aspect ratio from 2 to 5, a strain in the direction <004>, not greater than $4.2 \times 10^{-3}$ and a strain in the direction <110> not great than $3.0 \times 10^{-3}$.

From the point of view of incorporating magnesium hydroxide into thermoplastic materials and of required properties of the resulting materials, it is important that secondary particles formed by agglomeration of crystals of magnesium hydroxide, should have uniform distribution of particle size. Conventionally produced magnesium hydroxide contains 50% of secondary particles with diameters of 3 to 20 µm and 90% of secondary particles with diameters of 8 to 40 µm. Magnesium hydroxide produced according to EP 0 365 347 contains 50% secondary particles with diameters not greater than 1.5 µm and 90% of secondary particles with diameters not greater than 4.0 µm. Such prior art magnesium hydroxide is used for other purposes than the magnesium hydroxide according to this invention.

In the course of preparation of magnesium hydroxide after this invention, its crystals aggregate into secondary particles, of which 50% have diameters less than 1.4 µm and 100% have diameters less than 4.0 µm, while the specific surface, determined by the BET method, is less than 25 $m^2/g$.

Measuring of Crystallite Size and Strain In the Directions <110> and <004>

The crystallite size was calculated after the formula $D = K. \lambda/\beta. \cos \theta$ and the strain according to the formula $e = \beta/4. \tan \theta,$ wherein λ is the wavelength of the used X-RAY radiation (in this case CuKα with the wavelength 1.5406 Å), θ is the Bragg's angle, β is the true width of the peak of the sample at half-maximum intensity in radian and K is the instrumental constant (here K= 0.9)

The value β used in the formulas given above was determined as follows:

the diffraction profiles in the direction <110> and in the direction <004> were measured using the CuKα- radiation, -measuring conditions: voltage 40 kV, current 30 mA, goniometer speed 0.001°/s, spinner on, automatic diver-gence slit, receiving slit 0.2 mm, graphite monochromator.

Profile breadth at half-maximum intensity for Kα1 give after substraction of the background value the value $B_s$—profile broadening of the measured material.

Diffraction profiles corresponding to the instrumental profiles were measured using silicon of very high purity (99,999%) under the same measuring conditions.

In this case profile breadth at half-maximum intensity for $K\alpha_1$ gives after subtraction of the background value the value $B_0$— instrumental profile broadening. Numerical values of $B_0$ are 0.133 2 θ for the direction <110> and 0.141 2 θ for the direction <004>.

According to the facts given above the diffraction profile broadening caused by the measured material was calculated from the formulas $\beta(\text{size}) = B_s - B_0$ and $\beta(\text{strain}) = \sqrt{(B^2_s - B^2_0)}$ Another known method for determining the crystallite size and strain is described in U.S. Pat. Nos. 4,098,762 and 4,145,404, which method is incorporated herein by reference. There are other known methods for determining crystallite size and strain which may be used and which may give somewhat different values. In X-RAY diffraction crystallite size and strain exhibit themselves differently. Essentially, small crystallite sizes broaden X-RAY diffraction peak profiles with a Cauchy ($1/(1+x^2)$) shape, while strain broadens the profiles with a Gaussian ($\exp(-x^2)$) shape. This phenomenon is well known, and described for example by Klug and Alexander, X-RAY Diffraction Procedures, Wiley and Sons (1954 and 1974), Chap. 9 "Crystallite Size and Lattice Strains from Line Broadening".

Particle Size Measuring

The particle size was measured by a laser analyzer (PRO-7000) utilizing the principle of Fraunhoffer diffraction extended partially by the theory of Mie, which is valid for particles smaller than 1 μm. The instrument is controlled by a computer system. The samples were measured in an aqueous medium after dispersing by ultrasound for maximum of 150 s.

Specific Surface Measurement

The measurement of the specific surface is conducted in a known manner. A method of measuring the specific surface area by the BET method is described in U.S. Pat. Nos. 4,098,762 and 4,145,404, which method is incorporated herein by reference.

If desired, the magnesium hydroxide of the present invention may be treated with a surface active agent. The surface active agent is chemically absorbed onto the surface of the solid particles of the magnesium hydroxide, and this can lead to improved properties when the magnesium hydroxide is incorporated into thermoplastic synthetic resins or water soluble paints. The amount of surface active agent can be adjusted optionally to obtain the desired improved results. Such surfaces active agents for magnesium hydroxide are well known and include but are not limited to those described in U.S. Pat. Nos. 4,098,762 and 4,145,404.

Thermoplastic synthetic resins, especially those useful for melt shaping, can be formulated by incorporating the coated or uncoated $Mg(OH)_2$ of this invention therein. Useful thermoplastic synthetic resins are well known to those skilled in the art and include but are not limited to those described in U.S. Pat. Nos. 4,098,762 and 4,145,404. The amount of magnesium hydroxide added to the thermoplastic material can be adjusted optionally to obtain the desired improved properties.

Various conventional additives in customary amounts may be further incorporated into the thermoplastic resin compositions or paint compositions in accordance with this invention. Such additives include pigments, antioxidants, U.V. absorbers, plasticizers and lubricants, etc. Examples of such conventional additives and customary amounts are described in U.S. Pat. Nos. 4,098,762 and 4,195,404.

The following Examples and Comparative Examples illustrate the invention more specifically.

EXAMPLE 1

1 liter of aqueous solution of magnesium nitrate with concentration of 2 mol/l was heated in a reaction vessel with a capacity of 2.5 l, equipped with a heater and a stirrer, to 70° C. During intensive mixing 0.9 l of ammonia water with concentration of 11.9 mol/l (2.68-multiple excess of ammonia) was uniformly added within 5 minutes. 1 l of suspension resulting in this way was poured over to a 1.5 l pressure apparatus, which was then closed and heated to the temperature of 130° C. The suspension was held at the temperature for an hour. The pressure increased to 0.6 MPa. After an hour, the reaction mixture was cooled, the suspension was filtered, washed with demineralized water and dried.

The obtained product was analyzed by the X-RAY powder diffraction method. The resulting product was determine to have a crystallite size of 315 Å in the direction <004>, an aspect ratio of 2.81, a strain of $2.12 \times 10^{-3}$ in the direction <004> and a strain of $1.52 \times 10^{-3}$ in the direction <110>.

EXAMPLE 2

The same procedure as in Example 1 was used except that the concentration of ammonia water was 15.7 mol/l, which caused that pressure increased to 1.1 MPa during the treatment of the suspension.

The obtained product exhibited a crystallite size of 315 Å in the direction <004>, an aspect ratio of 3.53, a strain $2.18 \times 10^{-3}$ in the direction <004> and a strain $1.45 \times 10^{-3}$ in the direction <110>.

50% of particles with diameters less than 1.1 μm and all particles with diameters less than 4 μm were observed. The specific surface, determined by the BET method, was 9.9 $m^2/g$.

EXAMPLE 3

The same procedure as in Example 1 was used except that the pressure action was prolonged to 4 hours.

The obtained product exhibited a crystallite size of 309 Å in the direction <004>, an aspect ratio of 5.38, a strain $2.19 \times 10^{-3}$ in the direction <004> and a strain $1.31 \times 10^{-3}$ in the direction <110>.

50% of particles with diameters less than 1.1 μm and all particles with diameters less than 4 μm were found. The specific surface, determined by the BET method, was 6.57 $m^2/g$.

EXAMPLE 4

The same procedure as in Example 1 was used except that 1.3 l of ammonia water with the concentration of 15.7 mol/l was uniformly added within 20 minutes, time of the pressure action was 4 hours and the pressure was 1.3 MPa.

The obtained product exhibited a crystallite size of 355 Å in the direction <004>, an aspect ratio of 3.73, a strain $2.12 \times 10^{-3}$ in the direction <004> and a strain $1.43 \times 10^{-3}$ in the direction <110>.

50% of particles with diameters less than 1.1 μm were observed. The specific surface, determined by the BET method, was 8.83 $m^2/g$.

EXAMPLE 5

The same procedure as in Example 1 was used except that the suspension was held in the pressure apparatus at the temperature 120° C. for 40 minutes. The pressure increased to 0.5 MPa.

The obtained product exhibited a crystallite size of 301 Å in the direction <004>, an aspect ratio of 2.63, a strain 2.49×10⁻³ in the direction <004> and a strain 2.01×10⁻³ in the direction <110>.

50% of particles with diameters less than 1.06 μm and all particles with diameters less than 4 μm were observed. The specific surface determined by the BET method, was 8.6 m²/g.

EXAMPLE 6

Comparative Example 1 liter of aqueous solution of magnesium nitrate with concentration of 2 mol/l was heated in a reaction vessel with the capacity of 2.5 l (with a heater and a stirrer) to 70° C. During intensive mixing 0.9 l of ammonia water with the concentration of 4.0 mol/l was uniformly added within 20 minutes. 1 l of the suspension obtained in this way was poured over to a 1.5 l pressure apparatus, which was then closed and heated to the temperature of 130° C. The suspension was held at the temperature for an hour. The pressure increased to 0.25 MPa. After an hour, the reaction mixture was cooled, the suspension was filtered, washed with demineralized water and dried.

The obtained product exhibited a crystallite size of 259 Å in the direction <004>, an aspect ratio of 8.5, a strain 2.98×10⁻³ in the direction <004> and a strain 1.08×10⁻³ in the direction <110>.

50% of particles with diameters less than 2.1 μm and 90% particles with diameters less than 4 μm were found. The specific surface, determined by the BET method, was 26.39 m²/g.

EXAMPLE 7

Comparative Example

The same procedure as in Example 6 was used except that the concentration of ammonia water in the course of precipitation was 11.9 mol/l, the temperature of hydrothermal treatment was 100° C. and the pressure was 0.6 MPa.

The obtained product exhibited a crystallite size of 111 Å in the direction <004>, an aspect ratio of 9.6, a strain 6.11×10⁻³ in the direction <004> and a strain 1.63×10⁻³ in the direction <110>.

50% of particles with diameters less than 5.4 μm were observed. The specific surface, determined by the BET method, was 32.68 m²/g.

EXAMPLE 8

Comparative Example

The same procedure as in Example 6 was used except that the aqueous solution of the magnesium nitrate was heated only to 15° C. and ammonia water with a concentration of 14.7 mol/l was uniformly added within 5 minutes. The pressure was maintained for 4 hours (at the pressure of 0.8 MPa) at a temperature of 130° C.

The obtained product exhibited a crystallite size of 512 Å in the direction <004>, an aspect ratio of 1.62, a strain 1.94×10⁻³ in the direction <004> and a strain 1.88×10⁻³ in the direction <110>.

50% of particles with diameters less than 3.1 μm and 90% particles with diameters less than 6.3 μm were found. The specific surface, determined by the BET method, was 29.42 m²/g.

It is readily apparent from Comparative Examples 6, 7 and 8 that the process conditions directly affect the structural characteristics of the magnesium hydroxide, particularly the aspect ratio, and the strain and crystallite size in the <004> direction.

It is believed that the many advantages of the Mg(OH)₂ of this invention are apparent to those skilled in the art. It will also be apparent that a number of variations and modifications may be made in this invention without departing from it spirit and scope. Accordingly, the foregoing description is to be construed as illustrative only, rather than limiting. The invention is limited only by the scope of the following claims.

What is claimed is:

1. Magnesium hydroxide of the formula Mg(OH)₂ exhibiting a crystallite size in the direction <004>, greater than 150 Å and smaller than 500 Å, an aspect ratio in the range from 2 to 5, a strain in the direction <004> not greater than 4.2×10⁻³ and a strain in the direction <110> not greater than 3.0×10⁻³.

2. Magnesium hydroxide as claimed in claim 1 containing 50% of secondary particles with diameters smaller than 1.4 μm and 100% of secondary particles with diameters not greater than 4.0 μm.

3. Magnesium hydroxide as claimed in claim 2 having a specific surface, determined by the BET method, smaller than 25 m²/g.

4. Magnesium hydroxide as claimed in claim 1 comprising particles coated with a surface active agent chemically absorbed onto a surface of the magnesium hydroxide particles.

5. Magnesium hydroxide as claimed in claim 3 exhibiting a crystalline size in the direction <101> of 720 Å or below, an aspect ratio in the range of from 2 to 5.

6. Magnesium hydroxide as claimed in claim 5 comprising particles coated with a surface active agent chemically absorbed onto a surface of the magnesium hydroxide particles.

7. A process for preparing magnesium hydroxide as claimed in claim 1 comprising two steps, where, in a first step, magnesium nitrate is treated with a 1.5 to 6.0 multiple excess of ammonia in an aqueous medium, at a temperature of not more than 85° C., at the atmospheric pressure to form a basic magnesium nitrate and in a second step, decomposing said basic magnesium nitrate at a temperature of 110° to 150° C. and at a pressure not greater than 1.5 Mpa.

8. The process as claimed in claim 7 characterized by treating the magnesium nitrate with ammonia at a temperature of 50° to 75° C.

9. The process as claimed in claim 7 or 8 characterized by decomposing the basic magnesium nitrate at a temperature of 120° to 130° C. and at a pressure of 0.3 to 1.3 Mpa.

10. The process as claimed in claim 8 wherein the magnesium nitrate in the first step is treated with a 3.0 to 5.0-multiple excess of ammonia.

11. The process as claimed in claim 10 characterized by decomposing the basic magnesium nitrate at a temperature of 120° to 130° C. and at a pressure of 0.3 to 1.3 Mpa.

12. A process for preparing magnesium hydroxide as claimed in claim 5 comprising two steps, where, in a first step, magnesium nitrate is treated with a 1.5 to 6.0 multiple excess of ammonia in an aqueous medium,, at a temperature of not more than 85° C., at the atmospheric pressure to form a basic magnesium nitrate and in a second step, decomposing said basic magnesium nitrate at a temperature of 110° to 150° C. and at a pressure not greater than 1.5 Mpa.

13. A process for the production of magnesium hydroxide as claimed in claim 1, 2, 3, 4, 5 or 6 comprising:

(1) decomposing magnesite in dilute nitric acid with heat to produce an acidic magnesium nitrate solution and undecomposed magnesite, (2) separating out the undecomposed magnesite and removing iron and manganese impurities from said acidic magnesium nitrate solution to form a concentrated magnesium nitrate solution, (3) treating said concentrated magnesium nitrate solution with a 1.5 to 6.0-multiple excess of ammonia in an aqueous medium at a temperature of not higher than 85° C., at atmospheric pressure, to form a basic magnesium nitrate, and (4) decomposing said basic magnesium nitrate at a temperature of 110° to 150° C. and at a pressure not greater than 1.5 Mpa.

* * * * *

UNITED STATES PATENT AND TRADEMARK OFFICE
CERTIFICATE OF CORRECTION

PATENT NO. : 5,476,642
DATED : Dec. 19, 1995
INVENTOR(S) : PAVOL ŠKUBLA, ŠTEFAN BEZÁK, LADISLAV LENCSES, HORNÁ KRÁĽOVÁ and EVA KUKOVÁ

It is certified that error appears in the above-indentified patent and that said Letters Patent is hereby corrected as shown below:

On the cover page of the Patent, the entry in item [75] Inventors: should read:

" Pavol Škubla; Štefan Bezák, both of Šaľa; Ladislav Lencses, Horná Kráľová; Eva Kuková, Šaľa, Slovakia "

On the cover page of the Patent, the entry in item [73] Assignee: should read:

" Duslo, a.s., Šaľa, Slovakia "

On the cover page of the Patent, the entry in item [30] Foreign Application Priority Data, should read:

" May 26, 1993 [SK] Slovakia .......... PV 05 39-93 "

Signed and Sealed this

Twenty-third Day of April, 1996

Attest:

BRUCE LEHMAN

Attesting Officer

Commissioner of Patents and Trademarks